(12) United States Patent
Schepers et al.

(10) Patent No.: US 8,943,812 B2
(45) Date of Patent: Feb. 3, 2015

(54) APPARATUS FOR MEASURING THE FILLING LEVEL OF A UREA CONTAINER HAVING AN ULTRASOUND SENSOR AND MOTOR VEHICLE HAVING A UREA CONTAINER

(71) Applicant: Emitec Gesellschaft fuer Emissionstechnologie mbH, Lohmar (DE)

(72) Inventors: Sven Schepers, Troisdorf (DE); Jan Hodgson, Troisdorf (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 51 days.

(21) Appl. No.: 13/771,558

(22) Filed: Feb. 20, 2013

(65) Prior Publication Data

US 2013/0160433 A1      Jun. 27, 2013

Related U.S. Application Data

(63) Continuation of application No. PCT/EP2011/064047, filed on Aug. 15, 2011.

(30) Foreign Application Priority Data

Aug. 20, 2010    (DE) .......................... 10 2010 035 008

(51) Int. Cl.
| | | |
|---|---|---|
| *F01N 3/00* | (2006.01) | |
| *F01N 3/10* | (2006.01) | |
| *G01S 15/00* | (2006.01) | |
| *G01F 23/00* | (2006.01) | |
| *G01F 23/296* | (2006.01) | |
| *F01N 3/20* | (2006.01) | |

(52) U.S. Cl.
CPC ............ *G01F 23/00* (2013.01); *G01F 23/2963* (2013.01); *G01F 23/2962* (2013.01); *F01N 3/2066* (2013.01); *F01N 2610/142* (2013.01)

USPC ................................ 60/303; 60/295; 181/124

(58) Field of Classification Search
USPC ............. 60/286, 295, 301, 303; 181/123, 124
See application file for complete search history.

(56) References Cited

U.S. PATENT DOCUMENTS

| 3,985,030 A | 10/1976 | Charlton |
| 2002/0184945 A1 | 12/2002 | Chase et al. |
| 2004/0217103 A1 | 11/2004 | Knetsch et al. |
| 2007/0157602 A1 * | 7/2007 | Gschwind ....................... 60/274 |

FOREIGN PATENT DOCUMENTS

| DE | 10319151 A1 | 11/2004 |
| DE | 102007016858 A1 | 10/2008 |

(Continued)

OTHER PUBLICATIONS

International Search Report of PCT/EP2011/064047.

*Primary Examiner* — Audrey K Bradley
(74) *Attorney, Agent, or Firm* — Laurence A. Greenberg; Werner H. Stemer; Ralph E. Locher

(57) ABSTRACT

An apparatus for measuring a filling level of a urea container by determining distance using sound waves (ultrasound) emitted by a sensor and echoes thereof, includes a urea container bottom and a sump with an overall height. The sump is adjacent the urea container bottom and located below the level of the urea container bottom. The sump is connected in an open manner to the urea container and bounded at the bottom by a sump bottom. The sensor is accommodated in the vicinity of the sump and, with a sound-emitting surface for emitting sound waves and receiving echoes of the sound waves, is fitted in the urea container with the sound-emitting surface of the sensor at most adjacent the level of the urea container bottom. A motor vehicle having the urea container is also provided.

10 Claims, 3 Drawing Sheets

(56) References Cited

FOREIGN PATENT DOCUMENTS

| FR | 2814966 | A1 | 4/2002 |
| JP | 2002371831 | A | 12/2002 |
| JP | 4277761 | B2 | 6/2009 |
| WO | 2008122460 | A1 | 10/2008 |
| WO | WO 2009074428 A1 * | 6/2009 | ............ G01F 23/296 |

* cited by examiner

APPARATUS FOR MEASURING THE FILLING LEVEL OF A UREA CONTAINER HAVING AN ULTRASOUND SENSOR AND MOTOR VEHICLE HAVING A UREA CONTAINER

CROSS-REFERENCE TO RELATED APPLICATION

This application is a continuation, under 35 U.S.C. §120, of copending International Application No. PCT/EP2011/064047, filed Aug. 15, 2011, which designated the United States; this application also claims the priority, under 35 U.S.C. §119, of German Patent Application DE 10 2010 035 008.7, filed Aug. 20, 2010; the prior applications are herewith incorporated by reference in their entirety.

BACKGROUND OF THE INVENTION

Field of the Invention

The invention relates to an apparatus for measuring a filling level of a urea container (also referred to as an SCR tank) by distance determination using a sound-emitting sensor (also referred to as an ultrasound sensor). In particular, such urea containers are required for exhaust gas treatment as a reservoir for technically simply storage of a urea/water solution for forming ammonia. The invention also relates to a motor vehicle having a urea container.

Exhaust gas treatment apparatuses have long been used for the reduction of pollutants in the exhaust gases of internal combustion engines. Exhaust gas treatment apparatuses with a supply of a reducing agent have been customary for some time, in order to effectively reduce pollutants in the exhaust gas of an internal combustion engine. It has been found that, particularly in the case of lean-burn internal combustion engines, it can be advantageous to add a reducing agent to the exhaust gas. In particular, the proportion of nitrogen oxide compounds ($NO_x$) in the exhaust gas is increased in the case of lean-burn internal combustion engines and can be reduced in conjunction with a reducing agent in an exhaust gas treatment apparatus. The term selective catalytic reduction method (SCR method) is used.

Ammonia may be used, for example, as the reducing agent. Ammonia is converted with the nitrogen oxide compounds in the exhaust gas into non-hazardous constituents, namely nitrogen, water and carbon dioxide. Ammonia is not normally stored directly in the motor vehicle. Normally, a reducing agent precursor, which is converted on demand into the actual reducing agent, is stored and/or supplied. For example, urea may be used as such a reducing agent precursor. An aqueous urea/water solution is particularly preferred. Such an aqueous urea/water solution with a urea content of 32.5% is available, for example, under the trademark AdBlue®.

A reducing agent may be supplied to an exhaust gas treatment apparatus of an internal combustion engine in liquid and/or gaseous form. Normally, a reducing agent is stored in liquid form in a motor vehicle. Such liquid storage is possible in a particularly space-saving way. In accordance with current legal specification, according to the emission standard Euro V, pollutant output is reduced to a maximum permissible limit value of 2.0 g/kWh $NO_x$. It is therefore necessary for the vehicle driver to always be informed about the filling level of the urea container. When the urea container is empty and therefore no reducing agent can be supplied to the exhaust gas treatment apparatus, the engine power must be throttled. In order to avoid that from happening, it is important for the vehicle driver to be informed about the filling level of the urea container. Since the aqueous urea/water solution with a pH of about 9.0 is slightly alkaline, contactless filling level measurement is recommendable. It has been found that, to that end, measurement of the filling level by distance determination using a sound-emitting sensor is suitable in particular. In that case, in particular, use is made of the effect that sound is reflected at interfaces between gases and liquids or between gases and solids, or between liquids and solids. With suitable orientation of the sensor, the distance can be determined through the use of the time of flight, in a similar way to an echo sounder, with an emitted sound wave and the reflected echo. The filling level of the urea container can therefore be determined indirectly.

To date, measurement structures have been proposed which have a high space requirement. Since a urea container in the motor vehicle constitutes an additional component, in which there is already only little room for new components, a space-saving configuration of a urea tank with filling level measurement through the use of a sound sensor is desirable. In particular, a space-saving construction is highly expedient as a retrofit system and because of the urea consumption increasing further in the future due to more stringent emission standards, leading to an increasing urea container volume.

SUMMARY OF THE INVENTION

It is accordingly an object of the invention to provide an apparatus for measuring the filling level of a urea container having an ultrasound sensor and a motor vehicle having a urea container, which overcome the hereinafore-mentioned disadvantages and further alleviate the highlighted technical problems of the heretofore-known apparatuses and vehicles of this general type. In particular, a device is to be provided which on one hand saves on installation space and simultaneously allows simpler mounting. Furthermore, it is to be ensured that, after a sound-emitting sensor indicates that the filling level has reached a minimum limit value or is approaching zero, there is nevertheless still a sufficient residual volume of urea in order to be able to reach a filling station with the motor vehicle with optimal engine power and legally prescribed pollutant output, and refill the urea container there.

With the foregoing and other objects in view there is provided, in accordance with the invention, an apparatus for measuring the filling level of a urea container by distance determination using sound waves emitted by a sensor and their echo. The urea container has a bottom and a sump having an overall or physical height, the sump adjoining the urea container bottom and lying below the level of the urea container bottom, and the sump being connected in an open fashion to the urea container and being bounded underneath by a sump bottom. The apparatus comprises:
  a sensor accommodated in the region of the sump, and
  the sensor having a sound-emitting surface for emitting sound waves and for receiving echoes of the same sound waves being fitted in the urea container in such a way that the sound-emitting surface of the sensor adjoins at most the level of the urea container bottom.

The measurement of the filling level is based, in particular, on a time-of-flight measurement. In this case, use is made of the fact that an acoustic wave propagates with a finite velocity which is known for the respective propagation medium (in this case urea/water solution). When the sensor emits a sound wave, this wave requires a certain time in order to reach the interface between the liquid urea/water solution and the adjoining air. A large part of the sound wave is reflected at this interface and travels with the same wave velocity back to the sensor (or ultrasound sensor). The latter registers the time of flight from the moment of emission until reception of the echo, that is to say the reflected sound wave. This time of flight, multiplied by the known propagation velocity of the sound wave, gives a length. Since the sound wave must travel once forward and once back in order to be registered by the sensor, halving the length determined gives the distance between the sensor and the interface. In order to permit the filling level of the urea container to be inferred from this determined distance, the sound wave should strike the interface as perpendicularly as possible. If the sound wave strikes the interface too obliquely, then the reflected wave will vitiate the measurement result due to the extended distance. Also, with an orientation perpendicular to the interface, the propagation path is optimally short and therefore a more accurate measurement result is not only achieved, but is achieved in an optimally short time. Furthermore, attenuation effects in the urea/water solution are thereby minimized. In order to determine exact results, it is necessary to adapt the known propagation velocity of the sound wave to the urea/water solution temperature. In this way it is also possible to determine expansion effects of the urea/water solution due to the temperature, and filling levels for a frozen urea/water solution.

A urea container is any container or tank which is suitable for holding urea. In particular, it is made of a material which is insensitive to alkaline substances. For example, plastics are suitable for this, in particular thermosets, for example epoxy resins. The shape of the urea container is substantially determined by the volume to be held, the space allocated in the motor vehicle, simple maintenance and filling, but also by functional units of the urea container for frictionless operation. The functional units include inter alia a sump, a measurement unit for the filling level, a urea extraction device and often also a heating apparatus to counteract freezing of the urea/water solution and to counteract generation of vapor for various operating states of the internal combustion engine, or the exhaust gases.

The sensor for measuring the filling level has a double function. On one hand it emits sound waves, and on the other hand it is adapted to receive their echo. For this purpose, it is possible to use commercially available sensors which are adapted in a suitable way to register interfaces between liquids and gases. In order to avoid disturbing noises, the sensor should emit sound waves in the inaudible ultrasound range. Furthermore, the sensor should operate in an energy-saving fashion, since the number of instruments consuming electricity in motor vehicles is already very high and it is to be expected that the number of such instruments will increase further. It is also sensible to equip the sensor additionally with a thermometer, since with this it is possible to compensate for the expansion of the urea/water solution as a function of the temperature. Inference of the actual amount of reducing agent is therefore possible at high temperatures. Particularly at low temperatures, it is possible to suppress false indications in the event of partial icing. This is because a multiplicity of interfaces are formed by ice crystals and ice chunks in the urea/water solution in the event of partial icing. In this way, undesired false indications can occur, from a fluctuating filling level display to throttling of the engine. The sensor may possibly be formed merely of a sound-generating and sound-registering diaphragm, but may even physically include the entire measurement device. So-called piezofilms are conventional in the prior art for the sound generation and registering. These are capable of converting an input voltage signal directly into a mechanical deformation and thereby generating a sound. The mechanical deformation can be converted very exactly through the use of AC voltage into a stable oscillation frequency, generally the natural frequency of the piezofilm. Likewise, piezofilms are capable of converting mechanical deformations into a voltage. The use of piezofilms therefore not only represents a technically very simple embodiment of a sound sensor, but is also particularly economical.

The urea container includes a urea container bottom, although this does not constitute the sealing boundary of the urea container underneath, but merely delimits the main volume of the urea container, and a sump is connected to the urea container bottom. In most cases, the urea container bottom is inclined downward from the walls of the urea container to the sump, in order to ensure reliable delivery of the residues of the urea/water solution into the sump. In many cases, the urea container bottom merely constitutes a small shelf up to a phase at the transition from the sump to the main urea container volume. Conventionally, a urea container cover and laterally a multiplicity of urea container side walls may be assigned to such a urea container (at the top).

The sump of the urea container is used primarily to hold the residual volume of the urea/water solution, so that this residual volume can continue to be used in a technically straightforward way. It is thus clear that the sump generally has a significantly reduced circumference, or a significantly smaller volume, compared with the main urea container. There is therefore also a significantly increased filling level in the sump compared with an equal volume in the main urea container. The residual volume can therefore be extracted more easily by a urea extraction device. Furthermore, the sump is suitable for receiving impurities in the form of sediments in the bottom region, so that they are not taken in by a urea extraction device. The sump is bounded underneath by a sump bottom, which therefore constitutes the deepest bottom boundary of the urea container. The sump is therefore, for example, a local recess in the urea container bottom. It is furthermore preferred for there to be only a single sump and/or for the sump to be positioned centrally or in the middle with respect to the urea container bottom.

The sump adjoins the urea container bottom and preferably lies fully below the level of the urea container bottom. Since the urea container bottom only constitutes a plane surface in rare cases, it is only in rare cases that the level is to be equated with a plane surface which is congruent with the urea container bottom surface. Rather, the level is intended to mean a plane surface which intersects the transition from the urea container bottom into the vertical walls of the sump. Possibly, even the transition from the vertical walls of the urea container to the inclined urea container bottom is also to be understood as this level. In each case, the level is to be understood as orthogonal to the gravitational direction when the motor vehicle is stationary.

The sound-emitting surface of the sensor for emitting sound waves and for receiving the echo of the same sound waves may be the piezofilm already mentioned above. In most cases, however, this film adjoins an oscillation diaphragm which, for example, amplifies the sound emissions or else converts them to a suitable frequency. In most cases, there will also be a diaphragm in turn lying above, which forwards the sound waves with minor attenuation but in return constitutes additional mechanical and chemical protection for the diaphragm, or the piezofilm. Depending on the sensor structure and the construction of the urea container, the oscillation diaphragm and/or protective diaphragm may be integrated into one film. Likewise, one of the properties may be unnecessary independently of the other properties for the respective embodiment.

The sound-emitting surface of the sensor furthermore, as far as possible, adjoins the level of the urea container bottom.

In this case, the level and the sound-emitting surface may be parallel, although the sound-emitting surface may also be inclined with respect to the level of the urea container bottom. In particular, the sound-emitting surface may lie below the level of the urea container bottom. In no case does the sound-emitting surface protrude beyond the level of the urea container bottom (significantly—that is to say more than usual manufacturing tolerances for this object). As already mentioned, the perpendicular to the sound-emitting surface with respect to the upwardly directed perpendicular to the level of the urea container bottom may be inclined with respect to one another. Suitable angles with respect to one another are in this case, in particular 45°, 90° and 135°. Nevertheless, an opposite orientation, i.e. 180° of the two perpendiculars with respect to one another, is also possible.

The sound waves are substantially emitted upward (toward the urea container cover). It is clear that the sound waves propagate in the shape of an arc, or circularly. Nevertheless, for distance/time determination of the path of the sound wave it is important that the sound wave strikes the interface substantially perpendicularly and is therefore reflected back to the sensor. Minor deviations with respect to the perpendicular axis of ±30° or even ±20°, possibly also even ±10°, greatly alter the measurement result, but can be compensated for with a suitable configuration of the measurement device.

The sensor is preferably fully accommodated in the region of the sump. In particular, "fully" is intended to mean that the assembly, unit or module of the sensor, for example as it is commercially available, is accommodated in the region of the sump—that is to say it does not protrude into other inner regions of the urea container. In this case, the assembly, unit or module of the sensor may be formed only of the aforementioned sound-emitting surface or may also contain the necessary measurement apparatuses, such as also for example a thermometer besides the measurement circuit. In many cases, the associated cabling of the sensor counts as part of the component and is therefore in such cases accommodated in the region of the sump.

With its sump bottom, the side walls and the transition to the urea container bottom, the sump constitutes a volume. In many cases, however, this volume is not only filled with the urea/water solution but possibly also accommodates different assemblies, units or modules of the overall urea container. These assemblies, units or modules may be either built into the sump or else introduced through recesses and indentations in the sump bottom or in the sump walls. In this case, the assemblies, units or modules with the functional units, which may or must come in contact with the urea/water solution, may be formed so that they are open to the container volume. To this extent, in other words, it can also be provided that the sensor is fully accommodated in the region of the sump when the sensor also extends partially outside the urea container.

In particular, the sensor for measuring the filling level is configured in two parts, in which case the individual parts may be disposed separately. The sound-emitting surface (transmitter) in this case is disposed separately from the receiver for the echo. The comments regarding the configuration of the sensor may in this case be applied both to the transmitter and to the receiver.

In accordance with another advantageous feature of the invention, a urea extraction device is connected to the sump and lies at a height between the level of the urea container bottom and the sump bottom. Advantageously, the urea extraction device may be fitted at a distance from the sump bottom, so that settling particles are not taken in by the urea extraction device. In particular, a corresponding volume for dirt and deposits in the sump is provided. Furthermore, the urea extraction device may advantageously be fitted below the level of the urea container bottom, so that the collecting action of the sump can be utilized. In other words, this means in particular that the only extraction opening for metering or dosing the urea in the sump is preferably located on a side wall of the sump. At least one filter, a pump, a control valve and a metering or dosing unit, which optionally together form the urea extraction device, may then be connected thereto.

In a particularly preferred configuration, at least some of the aforementioned components per se are located in this case in the volume of the sump, for example in a separate housing. In another advantageous configuration, the urea extraction device is fitted below the sound-emitting surface of the sensor. The effect achieved by this is that, after emptying of the urea container has been established by the sensor, there is still a residual volume of urea in order to ensure a sufficient time in which the motor vehicle can, for example, reach a filling station with optimal operation and optimal pollutant emission, where the urea container can be refilled. It should, in particular, be ensured that the residual volume of urea is sufficient for a driving distance which can be covered with half to a full tank of fuel for the internal combustion engine. In this case, in particular, a separation of the sound-emitting surface and the urea extraction device is configured in such a way that a further driving distance of about 50 km, in particular about 200 km, up to 400 km, is ensured.

In accordance with a further advantageous feature of the invention, the sensor is fitted externally on the sump in a recess. This recess, which is disposed for example in the side wall and/or the bottom of the sump, is configured in such a way that the sensor is easily mounted and fully accommodated therein. The recess may therefore include a screw thread or/or be conical. Other fixing devices or fixations may also be used. In particular, the recess may be suitable for adjusting the sensor easily and reliably in order to ensure an exact filling level measurement. In this case, it may be advantageous to place the recess (protruding into the sump) in such a way that the sensor can be immovably mounted before installation in the motor vehicle. Furthermore, the recess may allow removal of the sensor, without the entire urea container or parts of the urea container having to be removed, and also without the urea container having to be emptied. In another advantageous embodiment, the sensor is held by an additional component on the sump or on the urea container, for example a cover. A combination of the holding device or holder of the recess and, for example, a cover is also possible.

In accordance with an added advantageous feature of the invention, the sensor protrudes at least partially into the sump. This, in particular, is intended to mean that the sound-emitting surface of the sensor is in direct contact with the urea/water solution. This allows the use of a commercially available sound sensor without additional construction measures on the sump. For further economical and simple mounting of the sensor on the sump, merely an opening, for example a hole, may be provided in the sump. The sensor may be introduced through this hole and fixed and adjusted by a further holding device or holder, for example a cover. A recess as described above may also be configured in such a way that a part of the sensor is guided through the recess and a part with the sound-emitting surface protrudes into the urea/water solution. For leak-tightness or sealing of the system, corresponding seals are to be provided.

In accordance with an additional advantageous feature of the invention, the overall height of the sump corresponds to an installation height of the sensor. The installation height of the sensor is dependent on the assembly, unit or module of the sensor as described above, as is the way in which the sensor is mounted. In this case, the installation height of the sensor may differ from the height of the sensor due to external holding devices or holders. The installation height may also be interpreted as the additional accommodation of the cabling of the sensor. The overall height of the sump extends, for example, from the sump bottom to the level of the urea container bottom when the latter is disposed "standing" there. In this embodiment, the sound-emitting surface of the sensor is, in particular, parallel to the level of the urea container bottom or inclined at 90° thereto. In this way, a particularly space-saving construction is generally achieved.

In accordance with yet another advantageous feature of the invention, the perpendicular to the sound-emitting surface of the sensor is oriented at an angle to the fundamental, important or main sound direction, and a sound deflection device or deflector deflects the sound waves substantially upward. Any angles are suitable in this case, between 0 and about 180°. In particular, however, 45°, 90° and 135° are suitable. The sound deflection device or deflector may be any surface which is suitable for reflecting sound waves. Since sound waves are likewise reflected at interfaces between liquids and solids, all solid materials are generally suitable for this purpose. In particular, however, it is recommendable to form this sound deflection device or deflector from wall regions of the sump or of the urea container. The sound deflection device or deflector thus constitutes an inclined surface of solid material, which is configured at a suitable position at a corresponding angle to the perpendicular to the sound-emitting surface, in such a way that the sound is substantially deflected upward. If the perpendicular is oriented at 90° with respect to the fundamental, important or main sound direction, for example, then the surface of the deflection device or deflector is inclined by 45°. The sound deflection device or deflector may, however, also be formed of a plurality of inclined surfaces, which are configured in a suitable way so that the sound waves are actually deflected substantially upward after multiple deflection by the plurality of surfaces. Likewise, the echo of the emitted sound waves is deflected by the sound deflection device or deflector back to the sensor in the reverse direction on the same path. Although this unfavorably increases the measurement path, it allows more flexible adaptation to a restricted installation space in the motor vehicle, in particular for retrofit systems. It is more particularly preferred in this case for the sensor to be disposed (laterally) "lying" and for the sound deflection device or deflector to be positioned in the region of the sump so that the sound arriving in an approximately horizontal direction is deflected in a direction toward the urea container cover (or the urea surface).

In particular, the sensor may also be used together with other measurement value transducers so that a plurality of physical characteristics of the urea/water solution can be recorded. In particular, a conductance sensor is additionally provided, which can establish the conductivity of the urea/water solution. In this way, for example, mixing of the urea/water solution with salt water can be detected and a corresponding indication can be given.

A method is furthermore provided, which may be employed in a particularly advantageous way when using the sound-emitting sensor proposed herein. The method is carried out with apparatuses which use a sensor that emits sound waves for distance determination, in order to measure the filling level of a urea container. In particular, the method is employed with the apparatus according to the invention. The method involves storing at least the filling level of the urea container before the apparatus is switched off, i.e. before the electrical supply of the apparatus is interrupted, for example because the internal combustion engine is switched off. This stored value for at least the filling level is intended to be provided to a controller or the switching device when the apparatus is reactivated, i.e. when the electrical supply is restored. In particular, other values may also be stored, for example the quality of the urea/water solution (electrical conductance, density, etc.).

This provision of a value for the filling level is advantageous, in particular, when at least some of the urea/water solution freezes in the urea container after the apparatus has been switched off. In this case, under certain circumstances a filling level measurement cannot be carried out by the sound-emitting sensor or would not generate a reliable value. The quality of the urea/water solution could already be measured after thawing of the urea/water solution in the vicinity of the sensor, but full thawing of the urea/water solution is necessary for determining the actual filling level. By providing a stored value at least for the filling level, determination of ranges which the vehicle can reach with the available urea/water solution can be carried out at any time by the controller or the switching device (even immediately after the apparatus is switched on again, or put into operation). By providing further stored values (for the density, electrical conductance, etc.), even information about the quality of the urea/water solution can be obtained immediately after the apparatus is switched on again, even though the sensors and measurement value transducers being used cannot yet generate reliable values due to the frozen urea/water solution.

With the objects of the invention in view, there is concomitantly provided a motor vehicle, comprising an internal combustion engine, at least one exhaust gas treatment apparatus, and a urea container having a sound-emitting sensor for measuring a filling level of the urea container by distance measurement using sound waves, the sensor being accommodated by the sump of the urea container. In particular, the motor vehicle is configured for carrying out the method according to the invention.

A motor vehicle can be any motor vehicle which has an internal combustion engine. This not only means motor vehicles which are driven or propelled by this internal combustion engine. For example, hybrid vehicles which use an internal combustion engine merely as a generator unit may also be envisioned. Motor vehicles having auxiliary devices such as crane and excavation devices, which are in turn driven (indirectly) by an internal combustion engine, may likewise be envisioned.

An internal combustion engine generally constitutes an energy conversion machine which is based on a closed or open cycle process. Internal combustion engines suitable therefor are any ones that use a fuel which, during combustion to convert the chemical energy into mechanical energy, generate emissions to such an extent that a reduction of the undesired emissions can be accomplished by using a reducing agent suitable for purification. These are generally reciprocating piston engines and plunger piston engines as well as rotary piston and, in particular, Wankel engines. Suitable fuels are inter alia diesel fuels and gasoline fuels, but also fuels such as natural gas and liquid gas. The internal combustion engine may be throttled by the signal from the sound-emitting sensor for measuring the filling level of the urea container in order to reduce the emissions in the event of an empty indication.

The at least one exhaust gas treatment apparatus is generally interposed in the exhaust gas line from the internal combustion engine to the tailpipe. In this case (upstream, i.e. in front) the urea/water solution or already gaseous ammonia is injected into the exhaust gases. The exhaust gas treatment apparatus is substantially controlled by emission measurements, although it may furthermore be switched off indirectly by the signal from the sound-emitting sensor for measuring the filling level of the urea container in the event of an empty indication.

The apparatus, including a urea container with the sound-emitting sensor, corresponds in its construction and its functionality to the type described in the preceding paragraphs.

Other features which are considered as characteristic for the invention are set forth in the appended claims, noting that the features individually mentioned in the claims may be combined with one another in any technically sensible way and supplemented with explanatory facts from the description, particularly in connection with the figures, with further alternative embodiments of the invention being presented.

Although the invention is illustrated and described herein as embodied in an apparatus for measuring the filling level of a urea container having an ultrasound sensor and a motor vehicle having a urea container, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
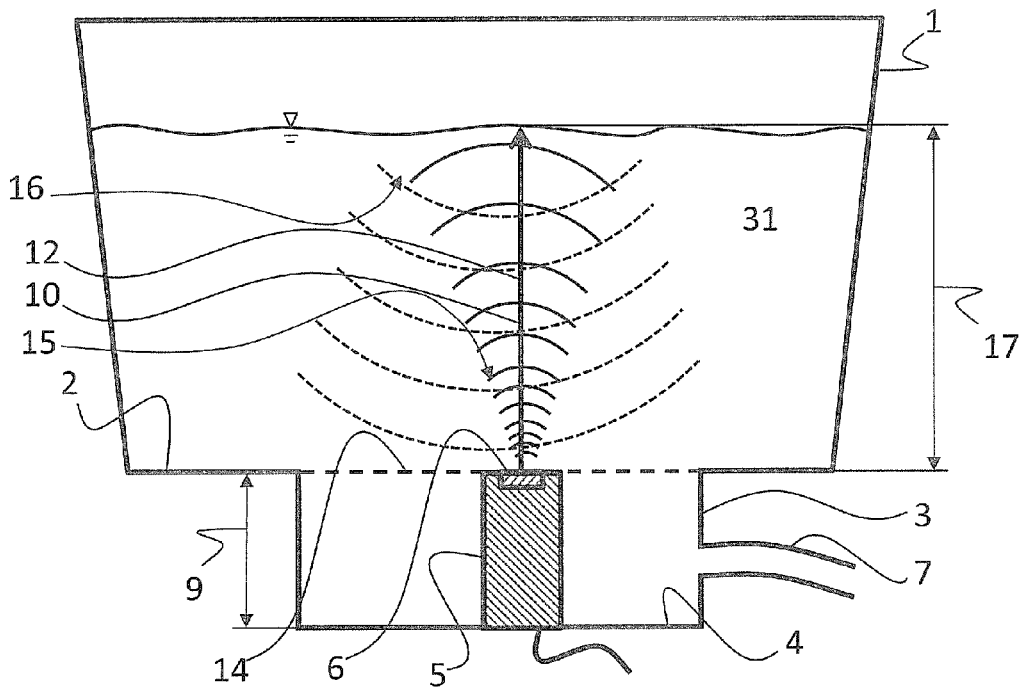
FIG. 1 is a diagrammatic, vertical-sectional view of a first alternative embodiment of a urea container, including a sump which fully accommodates a sound-emitting sensor.

Referring now in detail to the figures of the drawings, in which reference numerals always denote identical components or elements, even if not discussed explicitly in detail, permitting reference to be additionally made to a corresponding disclosure in another figure, and first, particularly, to FIG. 1 thereof, there is seen a urea container 1 which is filled with a urea/water solution 31 up to a filling level 17. A sump 3, having an overall height 9 and a sump bottom 4, is attached on a urea container bottom 2, below a level 14 of the urea container bottom 2. A sound-emitting sensor 5 extends in the sump 3 from the level 14 to the sump bottom 4. A sound-emitting surface 6 exactly adjoins the level 14 of the urea container bottom 2. A urea extraction device 7 is fitted in the region of the overall height 9 of the sump 3 in order to extract the urea. A total urea filling level is the sum of the height of the filling level 17 and the overall height 9 of the sump 3. The sensor 5 registers the filling level 17 (above the sump 3) through distance/time determination of sound waves 15 and of an echo 16 of the sound waves 15. In this case, a perpendicular 10 to the sound-emitting surface 6 of the sensor 5 and a fundamental, important or main sound direction 12 are congruent or identical. If the filling level 17 falls to the level 14 of the urea container bottom 2, then the sensor 5 indicates an empty urea container 1. Nevertheless, a residual extractable urea volume remains in the sump 3 between the level 14 of the urea container bottom 2 and the height of extraction by the urea extraction device 7.

Figure 2:
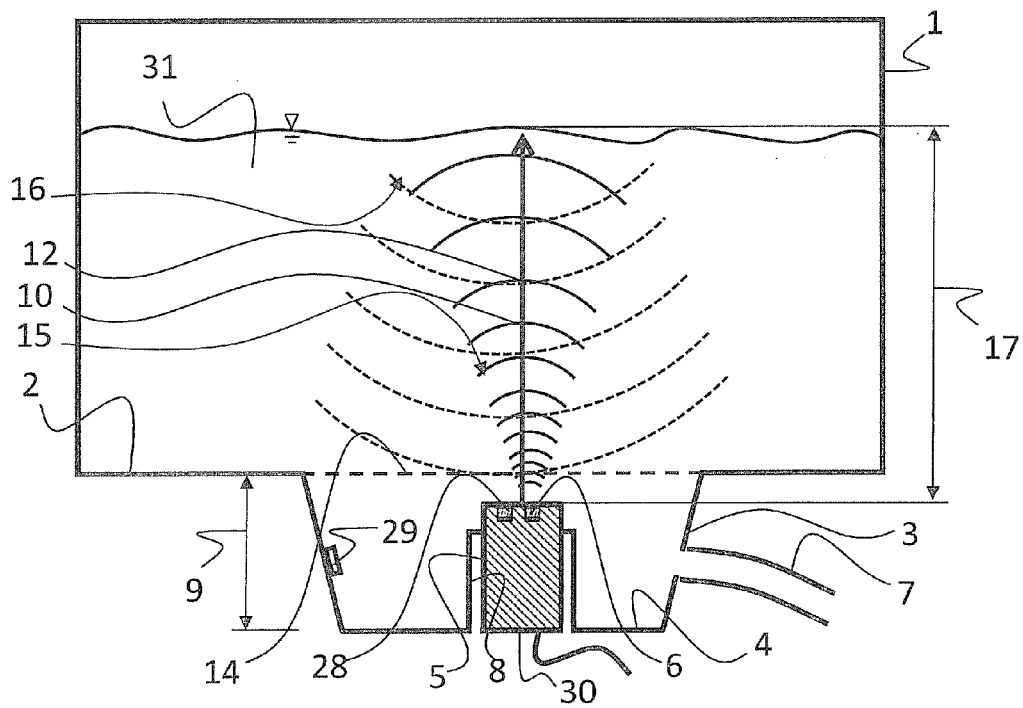
FIG. 2 is a vertical-sectional view of a second alternative embodiment of a urea container having a sump which fully accommodates the sensor, in which the sensor protrudes partially into the sump.

FIG. 2 shows a urea container 1 similar to that represented in FIG. 1. In contrast to FIG. 1, the sensor 5 is in a recess 8 in the sump 3, which protrudes from the sump bottom 4 in the region of the sump 3. The sensor 5 is furthermore configured in two parts, that is the sound-emitting surface 6 and a receiver 28 being disposed directly next to one another and in this case disposed in a common housing 30 of the sensor 5 as well. In addition, the sound-emitting surface 6 of the sensor 5 (and the receiver 28) protrudes into the sump 3. Furthermore, the sound-emitting surface 6 (and the receiver 28) of the sensor 5 lies below the level 14 of the urea container bottom 2. In this way, the sensor measures a filling level 17 which extends from the interface of the urea/water solution (surface of the urea/water solution) beyond the level 14 of the urea container bottom 2 to the sound-emitting surface 6 of the sensor 5. In this case again, however, the urea extraction device 7 is fitted below the sound-emitting surface 6 of the sensor 5. Once again, there is thus an extractable residual volume of the urea/water solution 31 after the sensor 5 indicates that the filling level 17 is "zero." Furthermore, a measurement value transducer 29 by which, for example, the electrical conductance of the urea/water solution 31 can be determined, is disposed in the sump 3 in this case.

Figure 3:
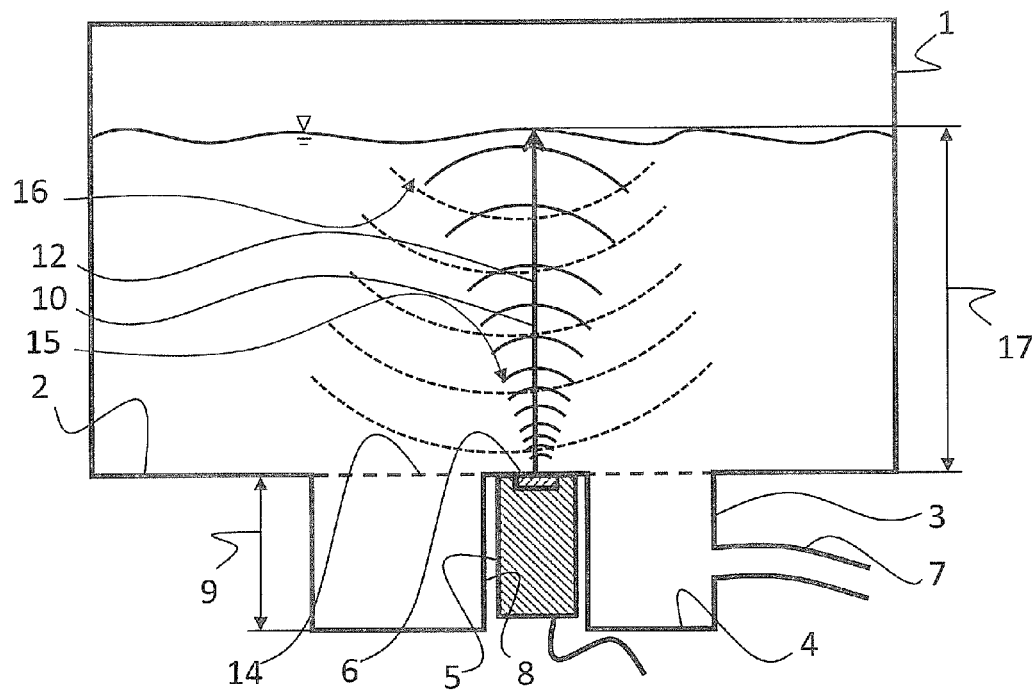
FIG. 3 is a vertical-sectional view of a third alternative embodiment of a urea container having a sump, in which the sensor is fully accommodated in a recess in the sump.

FIG. 3 shows a urea container 1 similar to the representation in FIG. 1. In this case, the sensor 5 is fully fitted in a recess 8 in the region of the sump 3. The recess, which is introduced from the sump bottom 4 of the sump 3, extends to the level 14 of the urea container bottom 2 in this case. The sound-emitting surface 6 of the sensor directly adjoins the region of the recess 8 which is congruent or identical with the level 14 of the urea container bottom 2. As in FIG. 2, in this case again the overall height 9 of the sump 3 is greater than the installation height of the sensor 5.

Figure 4:
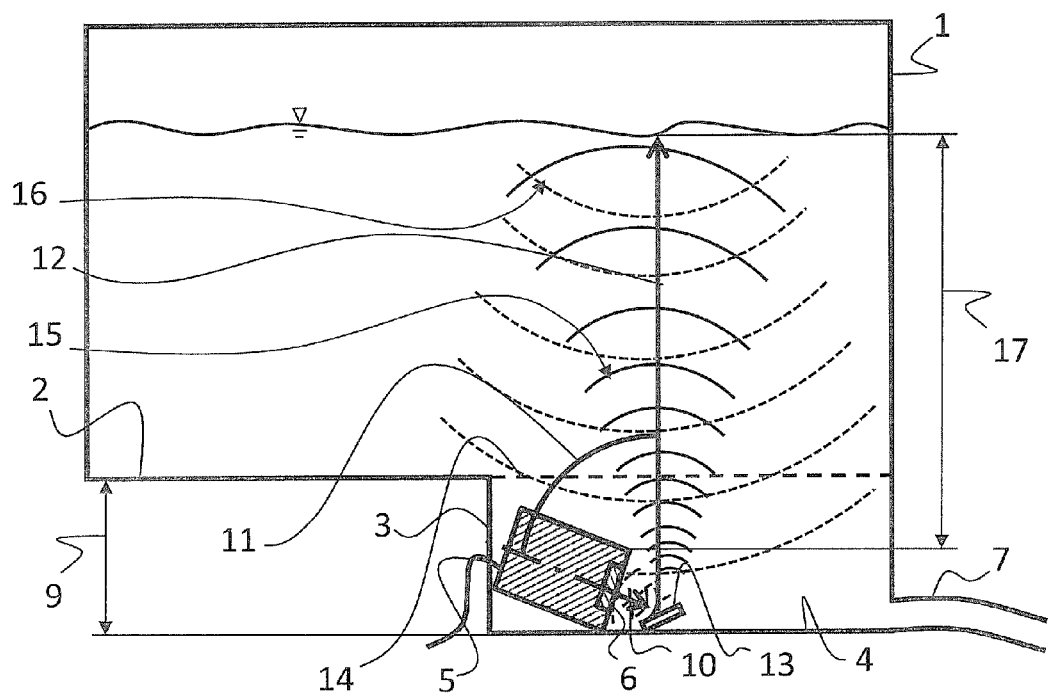
FIG. 4 is a vertical-sectional view of a fourth alternative embodiment of a urea container having a sump, in which a perpendicular to the sound-emitting surface of the sensor is oriented at an angle to the fundamental, important or main sound direction.

FIG. 4 shows a urea container 1 in which the sensor 5 is fully accommodated in the sump 3 as in FIG. 1. In contrast to the preceding figures, the perpendicular 10 to the sound-emitting surface 6 is disposed at an angle 11 with respect to the fundamental, important or main sound direction 12. The sound waves 15 emitted by the sound-emitting surface 6 initially propagate substantially along the perpendicular 10 to the sound-emitting surface 6. Due to a sound deflection device or deflector 13 integrated in the sump 3, the sound waves 15 are deflected in the direction of the fundamental sound direction 12. The echo 16 is first reflected in the reverse direction along the fundamental sound direction 12 as far as the sound deflection device 13, where the echo 16 is in turn deflected back along the perpendicular 10 to the sound-emitting surface 6. The filling level measurement in this case is bounded underneath by the uppermost end of the inclined sound-emitting surface 6. If the filling level of the urea/water solution falls below this point, an interface is formed which interferes with the measurement using sound. The sensor 5, or the measurement device of the sensor 5, is adjusted to this lower limit.

Figure 5:
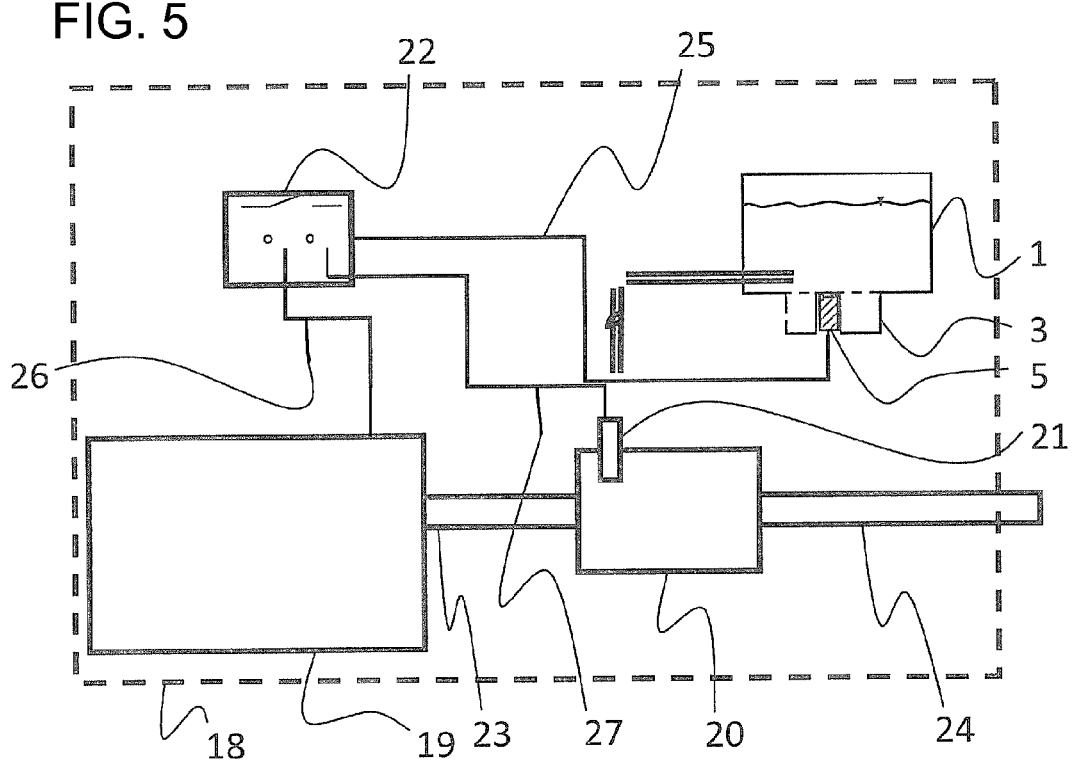
FIG. 5 is a vertical-sectional view of a motor vehicle, including an exhaust gas treatment apparatus and a urea container which is configured according to the device of the invention.

FIG. 5 shows a motor vehicle 18 having an internal combustion engine 19 and an exhaust gas treatment apparatus 20. A reducing agent (in this case liquid urea) is introduced through a metering or dosing nozzle 21 from the urea container 1, or from the sump 3, into the exhaust gas treatment apparatus 20 (for example a hydrolysis catalytic converter and/or an SCR catalytic converter). Exhaust gas from the internal combustion engine 19 is fed through an exhaust gas line 23 to the exhaust gas treatment apparatus 20 and purified or cleaned exhaust gas leaves the exhaust gas treatment apparatus 20 through a tailpipe 24. The sensor 5 in the urea container 1, or in the sump 3, indicates the filling level over a signal line 25 to a switching device 22. The switching device 22 is configured in such a way that it throttles the internal combustion engine 19 over an engine throttle signal line 26. The switching device 22 switches off the metering nozzle 21 over a metering nozzle closure signal line 27. The switching off or throttling by the switching device 22 takes place after an indirect period of time after indication by the sensor 5 over the signal line 25 to the switching device 22 that the urea container 1 is empty.

Figure 6:
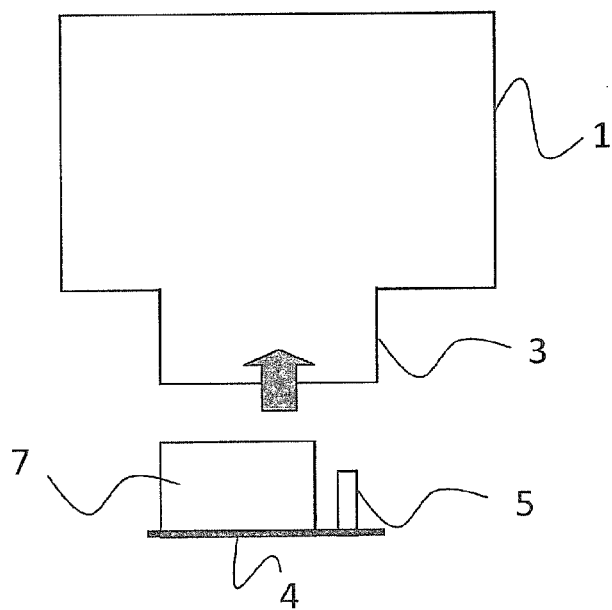
FIG. 6 is a vertical-sectional view of a further alternative embodiment of a urea container having a sump, in which the sump bottom with a urea extraction device and a sensor form an assembly, unit or module.

FIG. 6 diagrammatically represents another alternative embodiment of a urea container 1 having a sump 3, in which a sump bottom 4 with a urea extraction device 7 and a sensor 5 form an assembly, unit or module. As indicated, the urea extraction device 7 (for example with a filter, a pump, feed lines, sensors for pressure and/or temperature, return line, valve) and the sensor 5 may be premounted on a separate sump bottom 4 and finally fitted leak-tightly or sealed into the sump 3. The sump bottom 4 in this case is configured in the manner of a (stable, for example metallic) modular plate, in which case components which should not be in direct contact with the urea may be encapsulated (with a housing). Correspondingly, the other variants of the apparatus according to the invention which are mentioned herein may also be formed with premounted assemblies, units or modules, which are installed leak-tightly or sealed into an opening of the urea container 1.

The technical problems explained in the introduction in connection with the prior art have therefore been further alleviated. In particular, a device has been provided which on one hand saves on installation space and simultaneously allows simpler mounting. Furthermore, it is thus ensured that, after the sound-emitting sensor indicates that the filling level has reached a minimum limit value or is approaching zero, there is nevertheless still a sufficient residual volume of urea in order to be able to reach a filling station with the motor vehicle with optimal engine power and legally prescribed pollutant output, and refill the urea container there.

The invention claimed is:

1. A urea storage device for a motor vehicle comprising:
a urea container having a urea container bottom at a level and a sump lying below the level of the urea container bottom, the sump having an overall height and being downwardly bounded by a sump bottom and the sump adjoining the urea container bottom and having an open connection to the urea container;
an apparatus for measuring a filling level of the urea container, the apparatus including:
a sensor disposed in vicinity of the sump;
said sensor having a sound-emitting surface configured to emit sound waves and to receive echoes of the same sound waves for measuring the filling level of the urea container by distance determination; and
said sensor fitted on the urea container with said sound-emitting surface of said sensor adjoining at most the level of the urea container bottom, said sensor being disposed externally on the sump in a recess, and said sensor protruding at least partially into the sump.

2. The apparatus according to claim 1, which further comprises a urea extraction device connected to the sump and lying at a height between the level of the urea container bottom and the sump bottom.

3. The apparatus according to claim 1, wherein the overall height of the sump corresponds to an installation height of said sensor.

4. The apparatus according to claim 1, wherein said recess protrudes into said sump up to said urea container bottom.

5. The apparatus according to claim 1, wherein said sump is only one sump and said sump is disposed in a middle area of said urea container bottom.

6. The apparatus according to claim 1, wherein said sensor is externally disposed on an outside surface of said sump, and said sound emitting surface of said sensor is not in contact with urea solution.

7. The apparatus according to claim 1, wherein said sensor is externally disposed on an outside surface of said sump, in a liquid tight manner so that said sensor is removable without previously draining said urea container.

8. The apparatus according to claim 1, wherein said sound-emitting surface of said sensor directly adjoins a region of said recess which is congruent with a level of said urea container bottom.

9. A motor vehicle, comprising:
an internal combustion engine;
a urea container;
at least one exhaust gas treatment apparatus receiving exhaust gas from said internal combustion engine and receiving urea from said urea container; and
the apparatus according to claim 1 with said sound-emitting sensor for measuring a filling level of said urea container by distance measurement using sound waves, being accommodated in said sump of said urea container.

10. A urea storage device for a motor vehicle comprising:
a urea container having a urea container bottom at a level and a sump lying below the level of said urea container bottom, said sump having an overall height and being downwardly bounded by a sump bottom and said sump adjoining said urea container bottom and having an open connection to said urea container;
an apparatus for measuring a filling level of said urea container, said apparatus including:
a sensor disposed in vicinity of said sump;
said sensor having a sound-emitting surface configured to emit sound waves and to receive echoes of the same sound waves for measuring the filling level of said urea container by distance determination; and
said sensor fitted on said urea container with said sound-emitting surface of said sensor adjoining at most the level of said urea container bottom, said sensor being disposed externally on said sump in a recess, and said recess protruding at least partially into said sump.

* * * * *